UNITED STATES PATENT OFFICE.

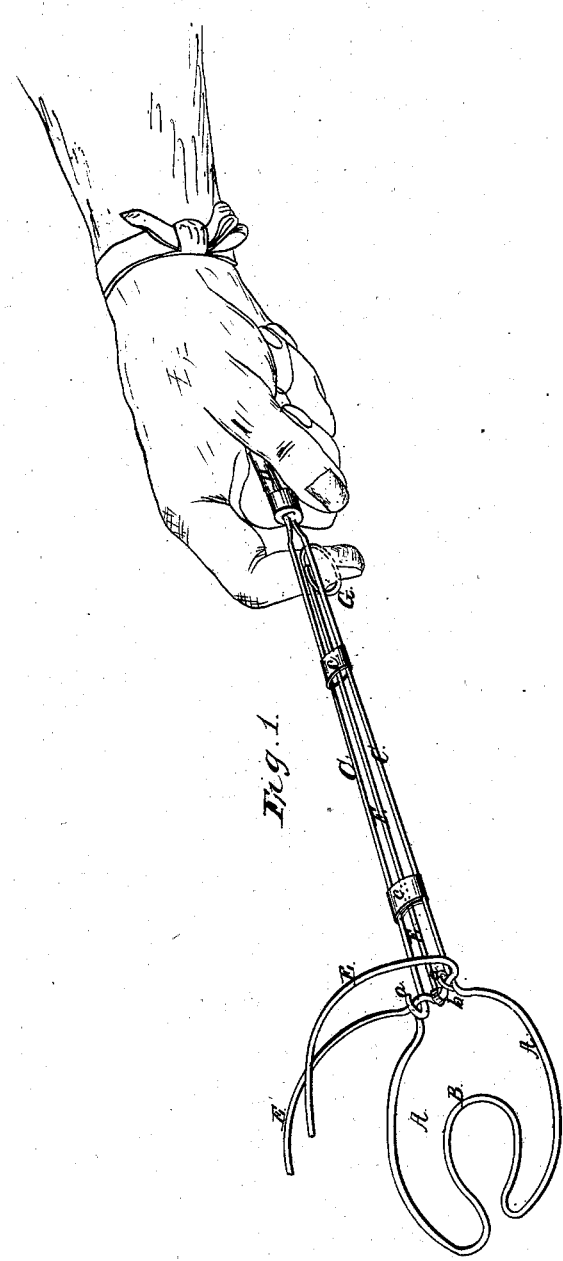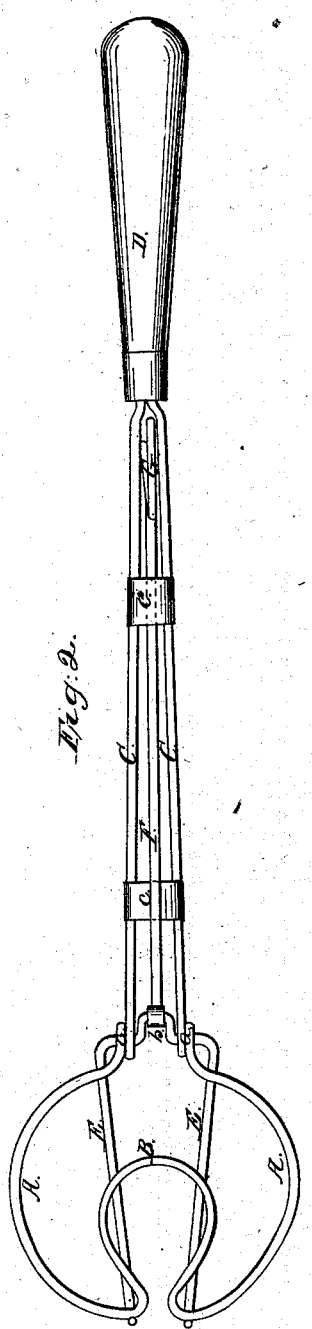

WM. B. DUNBAR, OF WATERBURY, CONNECTICUT, ASSIGNOR TO HIMSELF, AND GEO. H. SEYMOUR, OF PLYMOUTH, CONNECTICUT.

LADLE AND FORK.

Specification of Letters Patent No. 26,393, dated December 6, 1859.

*To all whom it may concern:*

Be it known that I, WILLIAM B. DUNBAR, of Waterbury, in the county of New Haven and State of Connecticut, have invented a Combined Vegetable-Ladle and Fork; and I do hereby declare that the following is a full, clear, and exact description thereof, reference being had to the accompanying drawings, forming a part of this specification, in which—

Figure 1, represents a perspective view of my invention showing clearly the operation of the same. Fig. 2, is a top or plan view showing its particular construction.

Similar letters of reference indicate corresponding parts in both figures.

The object of this invention and improvement is to facilitate the removal of vegetables such as potatoes, turnips, beets, &c., from the boiler, or pot, after they have gone through the process of boiling and are to be immediately removed therefrom while the water is in a boiling state.

My invention is a novel combination of ladle and fork and consists in hinging to the rear part of a ladle, made of suitable wire which is formed into a handle of any required length and secured in the end of a wooden holder, a fork having curved tines; and operating said fork so as to grasp the vegetables while in the boiler with the boiling water by a rod connected to the head of the fork, which is crank shaped, and passing through tubes which serve to keep the connecting rod in its place, said connecting rod terminating in a ring, into which the forefinger of the right hand is passed for operating the fork so as to grasp and retain the vegetable in the ladle during the removal of the same from the boiler as hereinafter described and represented.

In order to fully appreciate the utility of my invention it is only necessary to attempt the removal of vegetables from a pot of boiling water with a fork, or the ordinary ladle, as is the common practice in the kitchen. It is found to be a very difficult operation, besides disagreeable and oftentimes painful, as for instance, potatoes which become soft and mealy in boiling, by using the fork most likely are broken up and rendered useless, or are otherwise injured, by puncturing their skin and admitting the hot water to the edible portion. In order to remedy these objections I have invented an instrument, combining the fork and ladle, but using the fork only to grasp the potato and retain it in the ladle while removing it from the boiler. For this purpose the instrument is formed by bending a suitable wire into shape, forming a ladle A, and tongue B, and eyes $a$, $a'$, the wire is then continued out from the ladle a suitable length forming a handle C, the ends of the wire are then secured in the end of a wooden holder D. The fork is also made of one piece of wire formed into two curved tines E, E, with its head passing through the edges $a$, $a$, on the ladle and bent so as to form a crank or lever $b$, as clearly represented by the drawings Fig. 2. To this crank is attached a connecting rod F, which passes through tubes $c$, $c$, and between the handle C, of the ladle and terminates in a ring G, which is sufficiently near the wooden holder D, to be easily operated by the fore finger of the hand, while the instrument is held in the same hand; the movement of the finger thus opens the fork before the instrument is placed in the boiler, and when the potato, as the case may be, is in the ladle the finger is drawn forward which brings the fork down upon the potato and securely grasps it, when it may be held and removed from the boiler and placed in a suitable receptacle, the operation being performed in a ready and efficient manner.

The instrument can be manufactured and sold for a comparative trifle and will be found very useful in the kitchen for the purpose above described. It may also be made and finished for table use as an instrument for helping macaroni and all kinds of edibles.

Having thus described my invention what I claim and desire to secure by Letters Patent, is,

The combined ladle and fork, constructed in the manner described and represented for the purposes set forth as a new article of manufacture.

WM. B. DUNBAR.

Witnesses:
GEO. L. TOWNSEND,
STEPHEN W. KELLOGG.